(12) United States Patent
Milton

(10) Patent No.: US 7,255,092 B2
(45) Date of Patent: Aug. 14, 2007

(54) MULTILAYER FUEL MODULE FLANGE

(75) Inventor: Jeffery John Milton, Lake Orion, MI (US)

(73) Assignee: Siemens VDO Automotive Corporation, Auburn Hills ( * ) Notice: Subject to any disclaimer, the term of this patent is extended or adjusted under 35 U.S.C. 154(b) by 122 days.

(21) Appl. No.: 11/296,717

(22) Filed: Nov. 29, 2005

(65) Prior Publication Data

US 2006/0115370 A1    Jun. 1, 2006

Related U.S. Application Data

(60) Provisional application No. 60/631,481, filed on Nov. 29, 2004.

(51) Int. Cl.
 *F02M 55/02* (2006.01)
(52) U.S. Cl. ...................................... 123/509; 123/468

(58) Field of Classification Search ................ 123/468, 123/469, 509
See application file for complete search history.

(56) References Cited

U.S. PATENT DOCUMENTS

| | | | | |
|---|---|---|---|---|
| 5,351,548 | A * | 10/1994 | Briggs et al. .................. 73/718 |
| 5,511,957 | A * | 4/1996 | Tuckey et al. .............. 417/313 |
| 5,647,329 | A * | 7/1997 | Bucci et al. ................. 123/509 |
| 5,876,599 | A * | 3/1999 | Sylvester et al. ........... 210/232 |
| 5,960,817 | A * | 10/1999 | Johansen et al. ........... 137/202 |
| 6,634,341 | B2 * | 10/2003 | Crary et al. ................. 123/516 |
| 6,848,463 | B2 * | 2/2005 | Johansen ..................... 137/202 |
| 6,945,422 | B2 * | 9/2005 | Beyer et al. ................. 220/562 |
| 7,168,416 | B2 * | 1/2007 | Powell et al. ............... 123/509 |
| 7,175,481 | B1 * | 2/2007 | Cotton et al. ............ 439/733.1 |
| 2006/0243329 | A1* | 11/2006 | Doble ........................ 137/542 |
| 2007/0107700 | A1* | 5/2007 | Milton et al. ............... 123/509 |

* cited by examiner

*Primary Examiner*—Thomas Moulis

(57) ABSTRACT

A flange 10 is provided for a fuel pump module for a vehicle. The flange includes a first portion 12 of acetal material and a second portion 14 of an acid resistant material provided directly over at least certain regions of the first portion 12.

26 Claims, 1 Drawing Sheet

MULTILAYER FUEL MODULE FLANGE

This application is based on U.S. Provisional Application No. 60/631,481, filed on Nov. 29, 2004 and claims the benefit thereof for priority purposes.

FIELD OF THE INVENTION

This invention relates to a fuel module flange made of multiple layers of different materials, allowing the finished product to have improved properties over currently available flanges made of a single material.

BACKGROUND OF THE INVENTION

Conventional fuel delivery module flanges for automotive applications are primarily made of acetal or polyacetal polyoxymethylene (POM) since it offers a good balance of cost and performance in the demanding environment for fuel systems. Customers have asked for improved performance, specifically in relation to the resistance of the flange to acids, which may be present in the environment. There are many other available materials which could likely work as a monolayer part, but usually they have some property that makes them unattractive for other reasons, for example, low permeation resistance, reduced impact strength, or significantly higher cost. Likewise, there are other solutions, for example, putting a protective cover over the flange on the fuel tank, but these solutions add cost, assembly difficulty, and may not package in the available space in a vehicle.

The provision of a multilayer flange has been hampered by the ability of materials to adhere to acetal. Acetal tends to be very lubricious, not easily being bonded to by other materials. Leak paths around certain components are also potential failings of a conventional flange configuration. In addition, most development related to flanges has focused on improving permeation or making components of the flanges conductive.

Acetal is considered to be ideal for most characteristics, but for this new acid resistance requirement. Thus, there is a need to provide a multilayer flange containing acetal yet be resistant to acid.

SUMMARY OF THE INVENTION

An object of the invention is to fulfill the need referred to above. In accordance with the principles of the present invention, this objective is achieved by providing a flange of a fuel pump module for a vehicle. The flange includes a first portion of acetal material, and a second portion of an acid resistant material provided directly over at least certain regions of the first portion.

In accordance with another aspect of the invention, a flange is provided for a fuel pump module for a vehicle. The flange includes a body having a region requiring a certain overall thickness. The region includes an acetal material portion having a thickness less than the certain overall thickness. The region also includes an acid resistant material portion provided directly over the acetal material portion in an amount such that the combination of the thickness of the acetal material portion and the acid resistant material portion is substantially equal to the certain overall thickness.

In accordance with yet another aspect of the invention, a method of providing a flange for a fuel pump module for a vehicle includes the provision a flange body having a region requiring a certain overall thickness. The flange body is comprised of acetal material. Acetal material is removed from the region to define a skinned portion, with the thickness of the skinned portion being less than the certain overall thickness. Acid resistant material is provided directly over the skinned portion so that a thickness of the skinned portion together with the provided acid resistant material is substantially equal to the certain overall thickness.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawing, wherein like reference numerals refer to like parts, in which.

DETAILED DESCRIPTION OF THE EXEMPLARY EMBODIMENT

Figure 1:
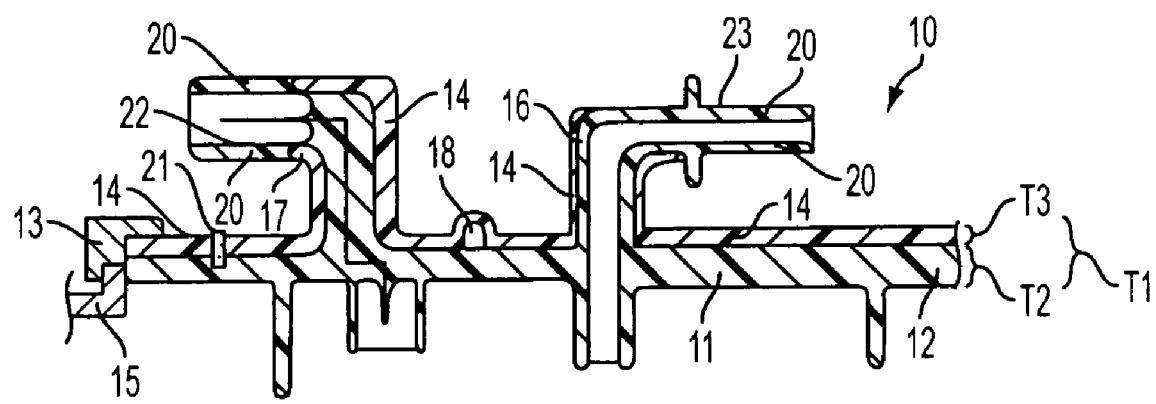
FIG. 1 is a sectional view of a fuel pump module flange provided in accordance with the principles of the invention.

The main concerns of providing a multilayer flange for a fuel pump module for a vehicle are bonding a different material to the acetal and covering all exposed surfaces with the different material. To cover the exposed surfaces, some design considerations need to be taken into account. Simply increasing the wall thickness of the entire part is not always an option, since some thicknesses are restricted by industry standards.

With reference to FIG. 1, a multilayer flange is shown, generally indicated at 10, in accordance with the principles of the present invention. The flange 10 is for a fuel pump module for a vehicle, of the type disclosed, for example, in U.S. Pat. No. 6,890,190, the contents of which is hereby incorporated by reference into this specification. In FIG. 1, a locking ring 13 removably secures the flange 10 to the fuel tank 15 in the conventional manner.

As shown in FIG. 1, a region of body 11 of the flange 10 has an overall wall thickness T1. In accordance with the invention, a portion 12 of the acetal material is removed from the flange 10 in environmentally exposed regions, e.g., the area under the fuel tank locking ring 13, to a thickness of T2. In the embodiment, the acetal material can be reduced from about 3.0 mm (T1) to define a skinned portion having a thickness of about 2.2 mm (T2). A material 14, resistant to acid, of a thickness of T3 is provided directly over the skinned portion. For example, a high density polyethylene (HDPE) or polypropylene (PP) is over molded in an amount substantially equal to the amount of acetal removed so that the overall wall thickness T1 of the region is again about 3.0 mm.

In the other regions of the flange 10 such as near a tube member 16 and a connector member 17, the overall wall thickness could remain the same as in conventional flanges with an acid resistance material 14 provided directly over the top of the skinned portion as described above, or the acid resistant material 14 can be provided to increase the overall wall thickness of the members 16 and 17.

Another area of environmental concern regarding the flange 10 is around quick connect ports and around electrical connectors. After consideration, the areas around these components do not need to be completely skinned and over molded with the acid resistant material 14. Only the area exposed to the environment needs to be skinned and provided with acid resistant material 14 there-over. Therefore, some areas 20 on the top of the flange 10 such as, underneath a tube member 23 having a quick connect or a hose barb, or inside an electrical connector member 22 do not need to be skinned. This greatly simplifies the required skinning of the flange 10.

Adhesion of the acid resistant material 14 to the acetal portion 12 is another concern. Previously, it was assumed that material had to be chemically bonded to the acetal to maintain its properties. Upon further investigation, a simple mechanical attachment via interference and mechanical locks is all that is required to maintain the function acid resistance material 14 on the acetal portion 12. Therefore, the act of over molding a tube or a connector, along with certain surface features e.g., knob 18 extending from the acetal portion 12 is sufficient to engage and keep the acid resistant material 14 in place. The acid resistant material 14 can also be mechanically secured to the acetal material 12 via a pin 21 or other fastening structure.

The durability of the material 14 when attached in the above-mentioned fashions is sufficient since HDPE is also the primary material that the fuel tank is made of, and exists in that environment already. The over molding of the acid resistant material 14 on the flange 10 is similar to many conventional processes in the injection molding industry, and could be done via either two-shot molding, or a separate mold for the flange 10 (acetal material) and the acid resistant material 14.

There is a possible cost reduction of the flange 10 since the acid resistant material 14 could be of a cost lower than that of the acetal material 12.

By providing a protective skin material 14 over the acetal 12 of a low cost, acid resistant material such as high density polyethylene (HDPE) or polypropylene (PP), the excellent properties of an acetal flange can be preserved while providing the acid resistance needed for the environment in which the flanges are exposed.

The protective skin material 14 can be provided in a two-shot mold whereby two different materials are molded in the same mold, without removing the component. Also, the skin material 14 can be a separate component that is stretched over certain areas of the flange. The skin material 14 can be held in place using chemical bonding such as glue or adhesive, until the skin material is locked in place by the tank locking ring 13.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A flange of a fuel pump module for a vehicle, the flange comprising:
    a first portion of acetal material, and
    a second portion of an acid resistant material provided directly over at least certain regions of the first portion.

2. The flange of claim 1, wherein the acid resistant material is a high density polyethylene (HDPE) material.

3. The flange of claim 1, wherein the acid resistant material is polypropylene (PP).

4. The flange of claim 1, further comprising fastening structure mechanically joining the second portion to the first portion.

5. The flange of claim 1, wherein the first portion includes at least one surface feature constructed arranged to mechanically engage the second portion to lock the second portion to the first portion.

6. The flange of claim 5, wherein the at least one surface feature is a knob extending from the first portion.

7. The flange of claim 5, wherein the surface feature includes a tubular member, the second portion being provided over at least certain areas of the tubular member.

8. The flange of claim 5, wherein the surface feature includes a connector member, the second portion being provided over at least certain areas of the connector member.

9. The flange of claim 1, in combination with a tank locking ring, wherein the tank locking ring captures the second portion there-under.

10. A flange of a fuel pump module for a vehicle, the flange comprising:
    a body having a region requiring a certain overall thickness, the region including an acetal material portion having a thickness less than the certain overall thickness, the region including an acid resistant material portion provided directly over the acetal material portion in an amount such that the combination of the thickness of the acetal material portion and the acid resistant material portion is substantially equal to the certain overall thickness.

11. The flange of claim 10, wherein the acid resistant material portion comprises a high density polyethylene (HDPE) material.

12. The flange of claim 10, wherein the acid resistant material portion comprises polypropylene (PP).

13. The flange of claim 10, wherein the acetal material portion includes at least one surface feature constructed arranged to mechanically engage at least a part of the acid resistant material portion to lock the acid resistant material portion to the acetal material portion.

14. The flange of claim 13, wherein the at least one surface feature is a knob extending from a surface of the acetal material portion.

15. The flange of claim 10, wherein the body includes a tubular member, the tubular member includes an acetal material and acid resistant material provided directly over at least certain areas of the acetal material.

16. The flange of claim 10, wherein the body includes a connector member, the connector member includes an acetal material and acid resistant material provided directly over at least certain areas of the acetal material.

17. A method of providing a flange of a fuel pump module for a vehicle, the method including:
    providing a flange body having a region requiring a certain overall thickness, the flange body being comprised of acetal material,
    removing acetal material from the region to define a skinned portion, with the thickness of the skinned portion being less than the certain overall thickness, and
    providing acid resistant material directly over the skinned portion so that a thickness of the skinned portion together with the provided acid resistant material is substantially equal to the certain overall thickness.

18. The method of claim 17, wherein the step of providing acid resistant material includes providing a high density polyethylene (HDPE) material.

19. The method of claim 17, wherein the step of providing an acid resistant material includes providing polypropylene (PP).

20. The method of claim 17, wherein the step of providing the flange body includes providing at least one surface feature constructed arranged to mechanically engage the acid resistant material to lock the acid resistant material to the acetal material.

21. The method of claim 17, wherein the at least one surface feature is a knob extending from the flange body.

22. The method of claim 17, wherein the step of providing the flange body includes providing a tubular member as part of the flange body, the method further includes molding acid resistant material directly over at least certain areas of the tubular member.

23. The method of claim 17, wherein the step of providing the flange body includes providing a connector member as part of the flange body, the method further includes molding acid resistant material directly over at least certain areas of the connector member.

24. The method of claim 17, wherein the step of providing acid resistant material includes over molding the acid resistant material.

25. The method of claim 17, further including using a mechanical structure to secure the acid resistant material to the acetal material.

26. The method of claim 17, further including capturing the acid resistant material under a tank locking ring.

* * * * *